(12) United States Patent
Fisher et al.

(10) Patent No.: US 8,954,589 B2
(45) Date of Patent: *Feb. 10, 2015

(54) MULTI-PROCESS BROWSER ARCHITECTURE

(75) Inventors: Darin Fisher, San Carlos, CA (US); Brett Wilson, Los Gatos, CA (US); Ben Goodger, Los Altos Hills, CA (US); Arnaud Weber, Saratoga, CA (US)

(73) Assignee: Google Inc., Mountain View, CA (US)

( * ) Notice: Subject to any disclaimer, the term of this patent is extended or adjusted under 35 U.S.C. 154(b) by 212 days.

This patent is subject to a terminal disclaimer.

(21) Appl. No.: 13/612,495

(22) Filed: Sep. 12, 2012

(65) Prior Publication Data

US 2013/0014037 A1    Jan. 10, 2013

Related U.S. Application Data

(63) Continuation of application No. 12/464,594, filed on May 12, 2009, now Pat. No. 8,291,078.

(60) Provisional application No. 61/052,719, filed on May 13, 2008.

(51) Int. Cl.
*G06F 15/173* (2006.01)
*G06F 9/54* (2006.01)

(52) U.S. Cl.
CPC .......... *G06F 9/542* (2013.01); *G06F 2209/545* (2013.01); *G06F 2209/543* (2013.01)
USPC ............ 709/226; 709/223; 709/224; 709/225

(58) Field of Classification Search
None
See application file for complete search history.

(56) References Cited

U.S. PATENT DOCUMENTS

| | | | |
|---|---|---|---|
| 6,212,560 B1 | 4/2001 | Fairchild |
| 7,343,419 B1 | 3/2008 | Robinson |
| 7,822,806 B2 | 10/2010 | Frank et al. |
| 8,291,078 B2 | 10/2012 | Fisher et al. |
| 2003/0028591 A1 | 2/2003 | Goloshubin et al. |
| 2003/0069927 A1 | 4/2003 | Malrnskog |
| 2004/0128342 A1 | 7/2004 | Meas et al. |
| 2004/0221002 A1 | 11/2004 | Karim |
| 2005/0172009 A1 | 8/2005 | Roh et al. |
| 2006/0184537 A1 | 8/2006 | Sauve et al. |

(Continued)

OTHER PUBLICATIONS

Third Chinese Office Action (with English-Language Translation) directed to related Chinese Patent Application No. 200980117366.4, mailed Nov. 20, 2013; 6 pages.

(Continued)

*Primary Examiner* — Brian P Whipple
(74) *Attorney, Agent, or Firm* — Sterne, Kessler, Goldstein & Fox P.L.L.C.

(57) ABSTRACT

Systems and methods for multi-process browser architecture are described herein. In an embodiment, a system for providing multi-process browser architecture includes at least one rendering process for each browser instance that renders a content area; and at least one browser process that communicates with one or a plurality of rendering engine processes. In another embodiment, a method for providing a multi-process browser architecture includes instantiating a unique rendering process for each content area instance and instantiating a unique browser process. In this way browsers may avoid the effects of faulty processes affecting other browser processes. This may improve user efficiency while enhancing user experience.

20 Claims, 7 Drawing Sheets

100

(56) References Cited

U.S. PATENT DOCUMENTS

2009/0228838 A1 9/2009 Ryan et al.
2010/0115119 A1 5/2010 Gallo et al.

OTHER PUBLICATIONS

Charles Reis et al., "Using Processes to Improve the Reliability of Browser-based Applications," Internet Article, [Online], Dec. 2007, pp. 1-13, University of Washington.
Charles Reis, "Improving the Security and Rubstness of Modern Web Browsers," Internet Article, [Online], May 2007, pp. 1-15, University of Washington.
Andy Zeigler, "IE8 and Loosely-Coupled IE (LCIE)," Internet Article, [Online], May 26, 2005, pp. 1-4. MSDN Blogs Homepage.
Anonymous, "Loosely-coupled Internet Explorer: Windows® 8," Internet Article, [Online], Mar. 2008, MSDN Homepage.
International Search Report for International Application No. PCT/US2009/002917, mailed on Jul. 8, 2009, European Patent Office, 3 pages.
Written Opinion of the International Searching Authority, PCT/US2009/002917, mailed on Jul. 8, 2009, European Patent Office, pp. 1-7
European Patent Office, Examination Report, Appln. No. 09746933.2; Dated: Jul. 2, 2013, 4 pages.
First Chinese Office Action (with English-Language Translation) directed to related Chinese Patent Application No. 200980117366.4, mailed Sept. 13, 2012; 48 pages.
Second Chinese Office Action (with English-Language Translation) directed to related Chinese Patent Application No. 200980117366.4, mailed May 16, 2013; 6 pages.
Australian Patent Examination Report No. 1 directed to related Australian Patent Application No. 2009246884, mailed Jun. 17, 2014; 4 pages.
Fourth Chinese Office Action (with English-Language Translation) directed to related Chinese Patent Application No. 200980117366.4, mailed May 9, 2014; 7 pages.
Australian Notice of Acceptance and Bibliographic Details at Acceptance directed to related Australian Patent Application No. 2009246884, mailed Oct. 1, 2014; 2 pages.
Fifth Chinese Office Action (with English-Language Translation) directed to related Chinese Patent Application No. 200980117366.4, mailed Sep. 26, 2014; 21 pages.
European Search Report directed to related European Patent Application No. 09746933.2, mailed Oct. 24, 2014; 6 pages.

MULTI-PROCESS BROWSER ARCHITECTURE

CROSS-REFERENCE TO RELATED APPLICATIONS

This application is a Continuation of co-pending U.S. application Ser. No. 12/464,594 filed on May 12, 2009, entitled MULTI-PROCESS BROWSER ARCHITECTURE, which is a Non-Provisional of U.S. Application No. 61/052,719, filed May 13, 2008, both of which are incorporated herein by reference in their entirety and for which priority is claimed.

BACKGROUND

1. Field of the Invention

Embodiments of the present invention relate to browser technology.

2. Background Art

Browsers are used to access web content or locally stored content. The location of such content is often identified by a location address such as a uniform resource locator (URL). A browser may use a URL to access content associated with the URL. A user can interact with a browser through a user-interface to direct a browser to different content areas.

Content areas may contain text, audio, video and other forms of content delivery. In a traditional windows environment, several content areas may be viewed in multiple windows where there may exist one window per content area. Modern day browsers allow a user to view several content areas in a single browser window. Viewing several content areas in a single browser window may be known as a tab view approach. Browsers which employ this approach to view content may be called as tab view browsers. A tab view browser may allow a user to switch between different content areas through the selection of different tabs. Furthermore, a user may view a content area in one tab while content for another tab is being obtained in the background by a browser.

Conventional browsers that are in use today include MICROSOFT INTERNET EXPLORER, MOZILLA FIREFOX, APPLE SAFARI and OPERA. A user may use any of these browsers to access a content area. A browser window is usually opened by clicking on an icon corresponding to the browser. Once a browser window has been opened, a user may open several other browser windows through the browser's user interface. However, new windows opened by the user using browser's user interface may not be opened as new operating system (OS) processes. Furthermore in browsers that follow a tab view approach, new tabs may not be opened up as new and unique OS processes. Newly opened tabs exist as part of a single browser process. A new OS process of a browser or a browser process may only be opened by double clicking on an browser icon.

If a fault occurs in any single tab rendering content in a browser, it affects all other content areas because they exist in the same browser process. In an example, a fault occurring in a tab rendering a single content area may cause the an unexpected termination of the browser process. An unexpected termination of the browser process may significantly degrade a user's experience.

Content in a browser is rendered for display on a display device by a rendering engine. Browsers in use today may feature a single rendering engine to render a content area for display. The content areas rendered by the rendering engine may exist in a single content area or several content areas in the case of a tab view browser. Thus a single rendering engine may render the content in multiple tabs in a tab view browser resulting in a one-to-many relationship between a rendering engine and content area(s). This approach may not be helpful to a user because a fault in the rendering engine may affect all content areas it is associated with. In examples where the rendering engine is a part of a browser process, this may cause the entire browser process to become unresponsive. An unresponsive browser process may prevent a user from interacting with a browser's user interface components. Furthermore no indication of an unresponsive state of the browser is usually provided to the user by the browser's user interface. This may affect user experience and may significantly reduce efficiency of a users task. A reduction in efficiency of a user's task may occur because the content that the user was interacting with, may now be unresponsive resulting in possible loss of work that has been completed by the user while interacting with that content.

Systems and methods are needed that prevent that prevent faulty browser processes from affecting other browser processes thereby improving quality of user experience and user efficiency.

BRIEF SUMMARY

Embodiments of the present invention relate to systems and methods for multi-process browser architecture. In an embodiment, a system for providing multi-process browser architecture includes at least one rendering process for each browser instance that renders a content area; and at least one browser process that communicates with one or a plurality of rendering engine processes.

In another embodiment, a method for providing a multi-process browser architecture includes instantiating a unique rendering process for each content area instance and instantiating a unique browser process.

In this way browsers may avoid the effects of a faulty process or a number of faulty processes affecting other browser processes. This may improve user efficiency while enhancing user experience.

Further embodiments, features, and advantages of the embodiments, as well as the structure and operation of the various embodiments are described in detail below with reference to accompanying drawings.

BRIEF DESCRIPTION OF THE FIGURES

Embodiments of the present invention are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

Embodiments of the present invention relate to systems and methods for multi-process browser architecture. In embodiments of this invention, quality of a user's experience and user efficiency is improved.

While embodiments of the present invention are described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

The term "URL" used herein refers to a content address. URLs may address content stored across one or more networks, such as the Internet. In another example, a URL may be a path corresponding to a location of a locally stored file. These examples are illustrative and are not intended to limit the definition.

The term "content area" used herein refers to an area of a user interface display that can display content addressed by an URL. As an illustrative example, the content displayed in the content area may include, for example, a web page, application, document, video, multimedia content, future utilized content mechanism, or any combination thereof. These examples are illustrative and are not intended to limit the definition.

The term "thread" used refers a sequence of executing instructions that can run independently of other threads yet can directly share data with other threads.

This detailed description of embodiments of the present invention is divided into several sections. The first section describes a multi-process browser architecture according to an embodiment of this invention with respect to FIGS. 1, 2A and 2B. The second section describes various methods according to embodiments of this invention, which may be used in operation of a multi-process browser architecture with respect to FIG. 3 through FIG. 6. The last section describes an example operation of an embodiment of a multi-process browser architecture.
System This section describes a multi-process browser architecture according to an embodiment with respect to FIG. 1-2B.

Figure 1:
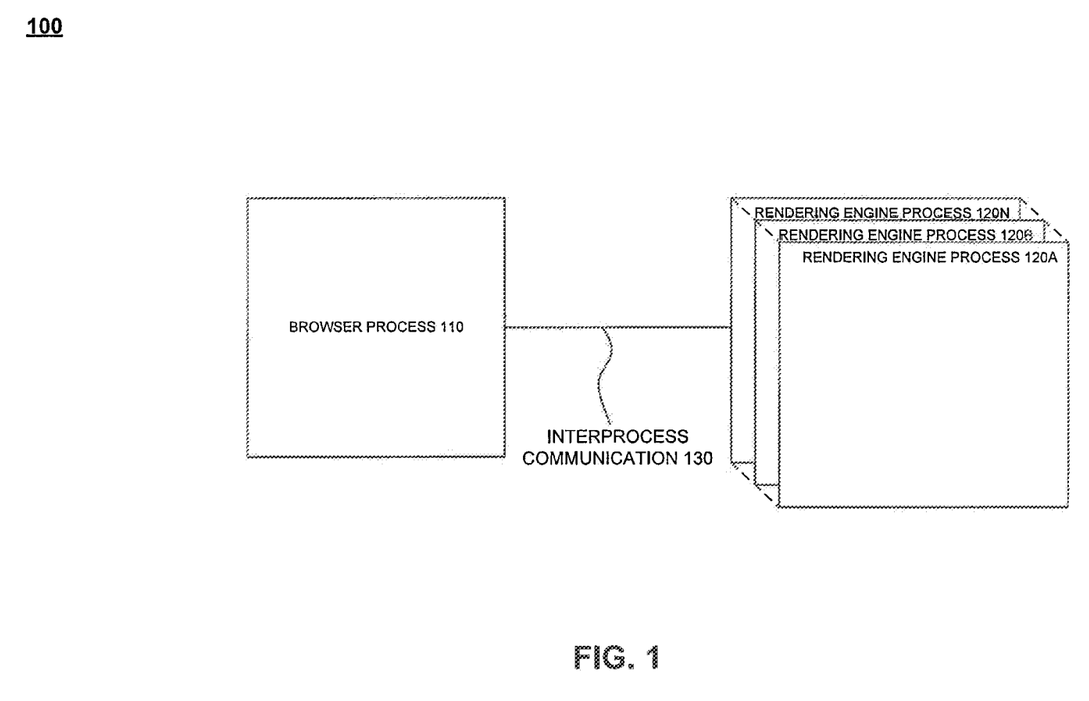
FIG. 1 is an architecture diagram of a multi-process browser architecture according to an embodiment.

FIG. 1 is an architecture diagram of a multi-process browser architecture according to an embodiment. FIG. 1 contains system 100.

System 100 may be implemented on any device that can support browsing. Such a device may include, but is not limited to, a device having a processor and memory for executing and storing instructions. Such a device may include software, firmware, and hardware. Software may include one or more applications and an operating system. Hardware can include, but is not limited to, a processor, memory and user interface display. Optional input devices, such as a mouse a touch sensitive screen, or any future developed interaction method may be used.

Multi-process browser architecture 100 may contact a remote server (not shown) and download data to display. In examples, the data may be represented as hypertext markup language, dynamic hypertext markup language, extendable markup language, image data, video or sound. In another example, multi-process browser architecture 100 may download and execute scripts according to the AJAX (Asynchronous JavaScript and XML) framework. The AJAX framework asynchronously transmits and receives data from a server to update a content area without reloading the content area.

Multi-process browser architecture 100 includes a browser process 110 coupled to one or a plurality of renderers 120A-N through inter-process communication 130. Browser process 110 can communicate with one or more we servers not shown) over one or more networks, such as the Internet. Browser process 110 can further communicate with an input (not shown) to allow a user to input data, to input commands, or to provide other control information to browser process 110. Rendering engine process(es) 120A-N can render data for display at a client device running browser process 110.

Browser process 110 and rendering engine process(es) 120A-N may communicate through inter-process communication 130. In an embodiment, inter-process communication 130 may include an inter-process communication method such as a named pipe.

A named pipe is a form of inter process communication known to those of skill in the art. A named pipe may allow two processes to communicate with each other. Named pipes may allow inter process communication without introducing additional threads. Furthermore, named pipes may allow users to have control over the construction of a named pipe. Control over construction of a named pipe may allow the user to impose security restrictions on communication over the named pipe and control overall performance of a named pipe.

Figure 2A:
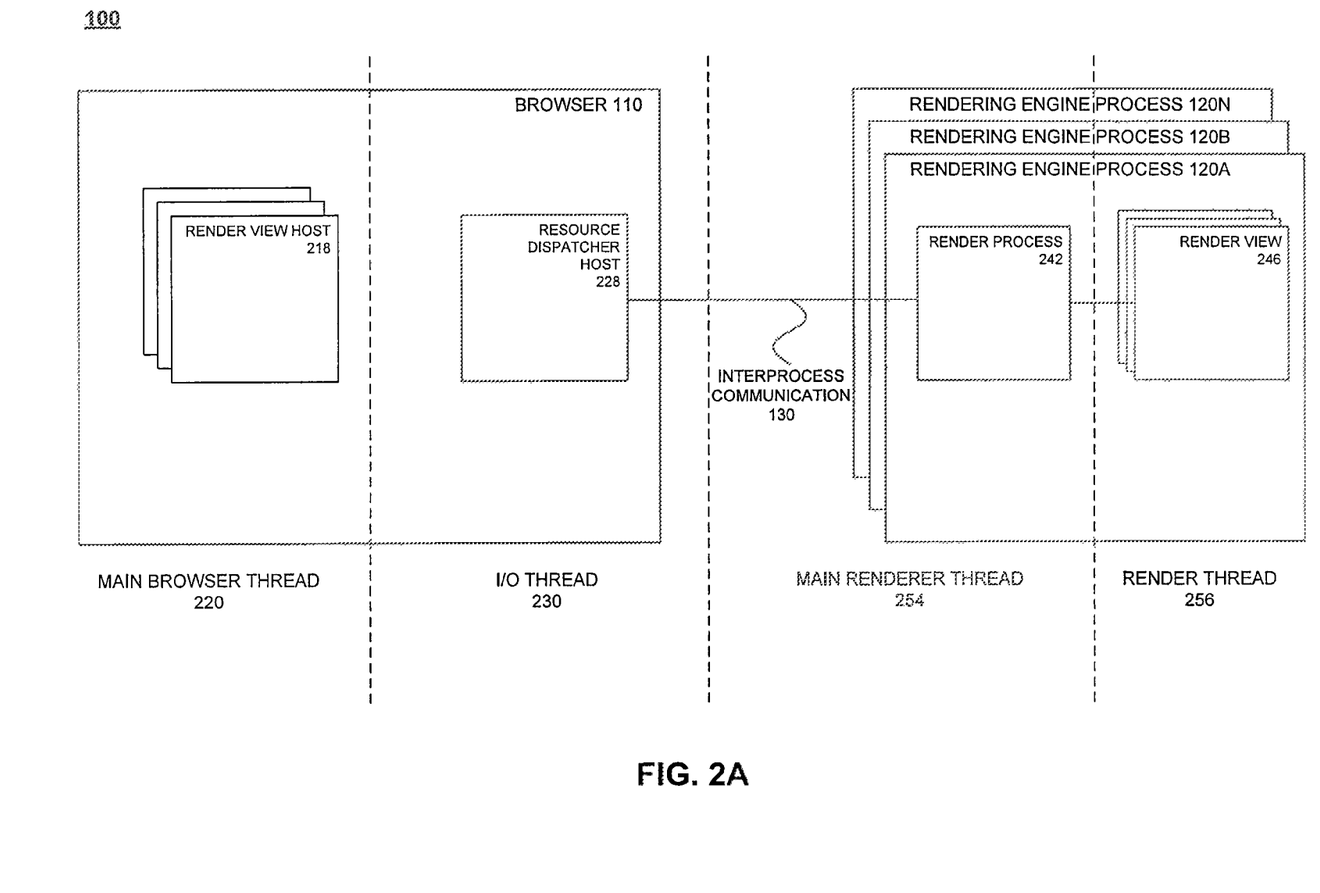
FIG. 2A is an diagram illustrating various threads in a multi-process browser architecture according to an embodiment.

FIG. 2A is a diagram illustrating the various threads involved in the operation of system 100. Main browser thread 220 may include one or a plurality of render view host(s) 218. I/O (Input/Output) thread 230 may include resource dispatcher host 228. Main renderer thread 254 may include render process 242 and render thread 256 may include one or a plurality of render view(s) 246. Render process host 214 and render process 242 may communicate through inter-process communication 130.

Inter-process communication 130 may communicate messages as contiguous arrays of bytes. Contiguous arrays of bytes may be communicated serially. Each message that is transmitted may be prefixed with a header structure. A header structure may define a message type, length of data contained in the message, and a routing identifier. The routing identifier may be used to specify a destination for a message within a receiving process. Messages may be communicated between different components of system 100, for example, during instantiations of content areas or interaction with instantiated content areas.

Figure 2B:
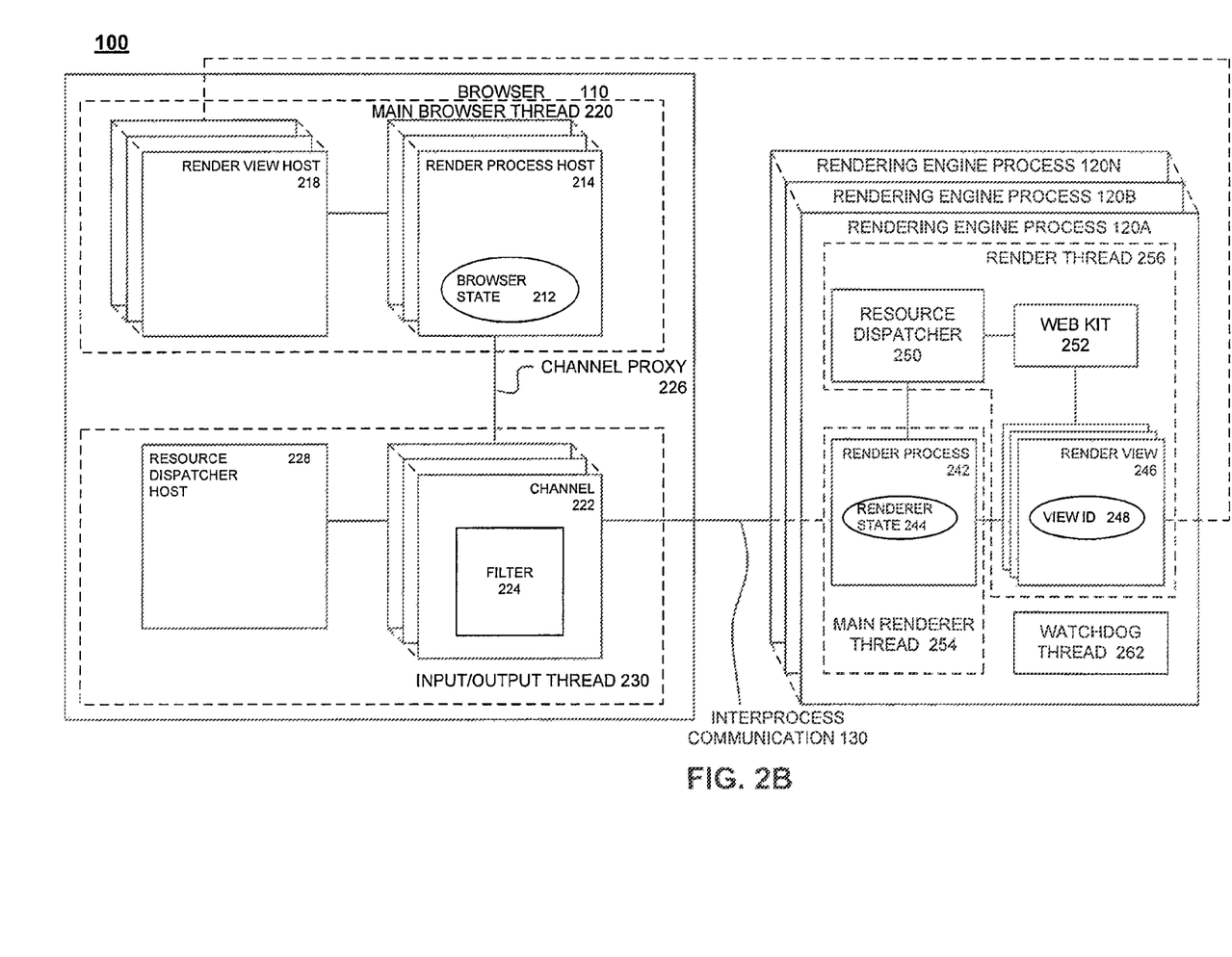
FIG. 2B is an architecture diagram illustrating the working of a multi-process browser architecture according to an embodiment.

FIG. 2B is a detailed architecture diagram illustrating the working of components of system 100.

FIG. 2B illustrates browser process 110 and a plurality of rendering engine processes 120A-N. In an embodiment, browser process 110 may further include a render view host 218, a render process host 214, a resource dispatcher host 228 and a channel 222. Channel 222 may furthermore comprise a filter 224. Render process host 214 further comprises a browser state 212. In the sections below, the various threads in system 100 are further described.
Main Browser Thread 220

Main browser thread 220 may include render view host 218 and render process host 214.

Render view host 218 may manage a render view 246. Render view host 218 may communicate a message through a corresponding render process host 214. Render process host 214 may communicate this message to render process 242. Render process 242 may then communicate the same message to a corresponding render view 246 in a rendering engine process 120A-N. Such messages may need to be communicated during instantiations of content areas or interaction with instantiated content areas. In this way, render view host 218 may communicate with and manage a render view 246. In an embodiment, a plurality of render view host(s) 214 may manage a plurality or render view(s) 246.

Render process host 214 may exist for each of a plurality of rendering engine process(es) 120A-N. Render process host 214 may manage a browser state 212 and communication with the rendering engine process 120A-N. A render process host 214 corresponding to each render view 246 maintains a render view host 218 in the main browser thread 220.

Browser state 212 may be maintained by browser process 110. Browser state 212 may include session information of rendering engine process(es) 120A-N. If a rendering engine process 120A-N experiences a fault in its operation or needs to terminate, browser process 110 may be able to recreate the faulted rendering engine process(es) 120A-N and restore its session information stored in browser state 212. Browser state 212 may include session cookies or session history that may have accumulated while a user is browsing different content areas. As an example, a session cookie may be used by a web server to differentiate users and to maintain data related to the user during navigation. Session history may include a list of previously visited content areas and their respective state rendered by rendering engine process 120A-N. The session history for a content area rendered by rendering engine process 120A-N may include a single or a plurality of user values entered in the form fields. Additionally session history may store the scroll position of a content area.

Input/Output (I/O) Thread 230

Input/Output (I/O) thread 230 may include resource dispatcher host 228 and channel 222. Channel 222 may further include filter 224. I/O (Input/Output) thread 230 may be used by browser process 110 to communicate with rendering engine process 120A-N. Furthermore an I/O thread 230 in association with the main browser thread 220 may communicate messages from browser process 110 to one or a plurality of render view(s) 246. Resource requests for content corresponding to a content area in browser process 110 may be communicated by I/O thread 230.

Channel 222 may communicate messages to the main browser thread 220. Referring to FIG. 2B, channel 222 may reside in I/O thread 230. Channel 222 may act as a proxy between render view(s) 246 and the main browser thread 220. Channel proxy 226 may communicate messages between channel 222 and render process host 214.

Filter 224 which may reside in channel 222, may be constructed in the channel by render process host 214. Filter 224 may intercept resource request messages from rendering engine process(es) 120A-N and may forward them directly to the resource dispatcher host 228.

In this way, resource requests for content may be handled by I/O thread 230 and this may reduce the amount of resource handling needed to be done by the main browser thread 220.

Main Renderer Thread 254

Main renderer thread 254 may include render process 242. Render process 242 may further include a renderer state 244.

Render process 242 may be included in each renderer process 120A-N. Render process 242 may manage communication with browser process 110 and may also maintain a renderer state 244. Each render process 242 may communicate with one or plurality of render view(s) 246.

Renderer state 244 may maintain information relating to the state of a corresponding rendering engine process 120A-N. Renderer state 244 may include information on if the corresponding rendering engine process 120A-N has become unresponsive or if it is requesting system resources.

Render Thread 256

Render thread 256 may include resource dispatcher 250, webkit 252 and render view 246.

Render view 246 may correspond to a unique content area in a browser. As an example, not intended to limit the invention, each new window or tab instantiation may create a new rendering engine process 120A-N and create a render view 246 for that process. As an example, not intended to limit the invention, a content area may be a tab in a tab view browser. In another embodiment, render view 246 may include a Hyper Text Markup Language (HTML) parser and a JavaScript interpreter. An HTML parser is known to a person of skill in the art and may be used to identify HTML mark-up tags to render content appropriately. A JavaScript interpreter may be used to identify JavaScript that may be a part of content.

Render view 246 may be managed by render process 242. Each render view 246 is identified by a view ID 248. View ID (View Identifier) 248 may be used to identify different instances of render view 246 in a particular renderer process 120A-N. View ID(s) 248 may be unique in an instance of renderer process 120A-N. In order to identify a render view 242 from a browser process 110, a render process host 214 in addition to a view ID 248 may be required. Communication from browser process 110 to a specific content area may be accomplished through render view host 218.

Resource dispatcher 250 may be included in each render process 120A-N. Resource dispatcher 250 may communicate with webkit 252. Resource dispatcher 250 may handle resource requests for content corresponding to a content area in browser process 110.

Webkit 252 may be included in each render process 120A-N. Webkit 252 may store and manage content in a content area of browser process 110 in the form of a data structure.

Watch Dog Thread 262

Watch dog thread 262 may be included in each rendering engine process 120A-N. Watch dog thread 262 may detect a faulty rendering engine process 120A-N and may terminate the corresponding rendering engine process 120A-N.

In an embodiment, browser 110 may send a message to watchdog thread 262 in response to a user request to close a tab that may be un-responsive. Such a message may allow the watchdog thread 262 to terminate the rendering engine process 120A-N.

Sharing of a Rendering Engine Process by Content Areas

Any one of the rendering engine processes 120A-N may need to be shared between different content areas, for example, tabs or windows. This may occur when a parent content area instantiates a new child window that it may want to communicate with. This communication may be accomplished with the help of a handle. As an example, not intended to limit the invention, a handle may be an identifier that enables a parent content area to establish communication with a child window. To render content, a child content area may use the same instance of rendering engine process 120A-N that rendered the parent content area. In the case where a new child content area may need to be instantiated as a new window, a render view 246, may communicate information to render view host 218. Render view host 218 may then instantiate a new tab or a window for the child content area. The render view 246 corresponding to the parent content area may then pass an identifier to a new render view 246 corresponding to the child content area to the render view host 218. This may allow the child content area to use the same instance of rendering engine process 120A-N that rendered the parent content area.

Prioritizing Content Areas

As an example, any one instance of rendering engine process(es) 120A-N may be associated with an active content area at a given time. An active content area may refer to any content area that the user is currently interacting with. An example of an active content area may be a foreground tab or a foreground window. In an embodiment, not intended to limit the invention, a rendering engine process 120A-N that renders a background content area may be treated as a low priority process. A low priority process may get lower priority in the allocation of system resources. Furthermore, a low priority process may be more likely to have its memory swapped out than the foreground renderer process. Memory swapping refers to a method commonly used by persons of skill in the art. As an example, not intended to limit the invention, memory swapping enables an operating system to execute programs and manipulate data files larger than its main memory. The operating system may store as much data as possible into main memory, and leave the rest on a disk. When the operating system needs data from the disk, it may a replace portion of data, commonly referred to in the art as a page or a segment, in main memory with a portion of data on the disk.

Operation

This section describes various methods that may be used in operation of the system described in FIG. 1-2B. For clarity, the methods are described with respect to system 100, however they are not intended to be limited to system 100.

Figure 3:
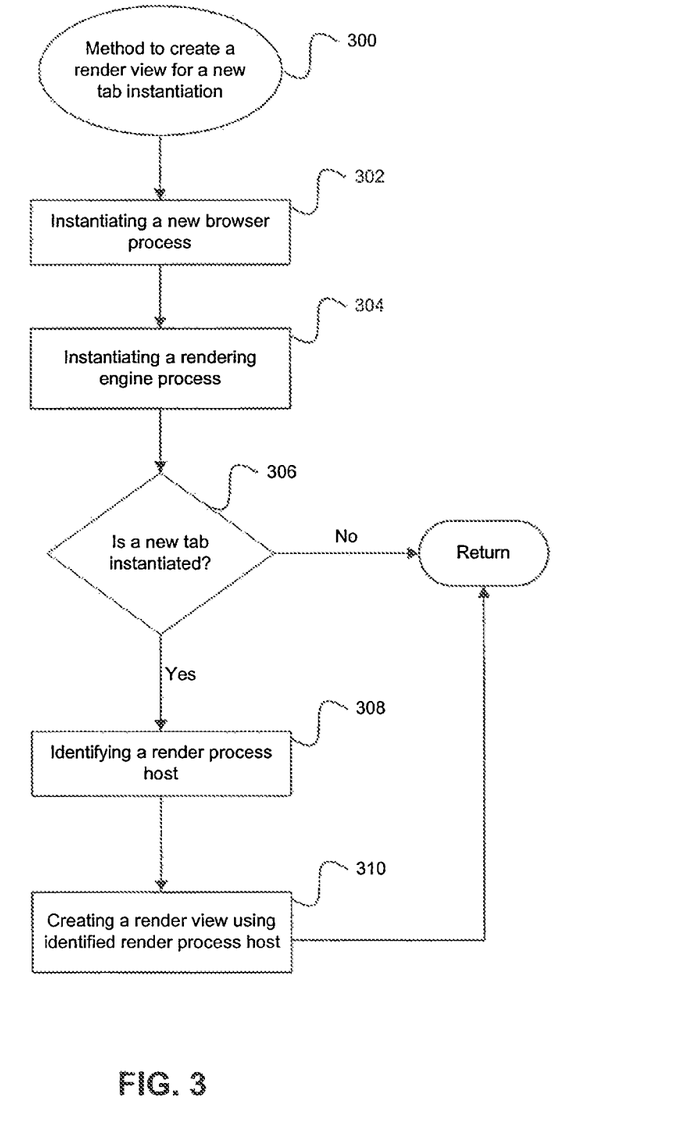
FIG. 3 is a flowchart illustrating a method which may be used to create a render view for a newly instantiated tab according to an embodiment.

FIG. 3 is a flowchart illustrating a method 300 according to an embodiment which may be used to create a render view for a newly instantiated tab (steps 302-310). Method 300 begins with a user instantiating a browser process 110 by clicking on the respective icon (step 302). Browser process 110 instantiates a new rendering engine process 120A to render content that may be addressed by browser process 110 (step 304). Browser process 110 checks if a new tab has been instantiated (step 306). If a new tab has not been instantiated method 300 returns. If browser process 110 determines that a new tab has been instantiated, render view host 218 identifies a render process host 214 to create render view 246 (step 308). Render view 246 is then created by render process host 214 (step 310). In this way, a new render view for a tab instantiated by a user may be created.

Figure 4:
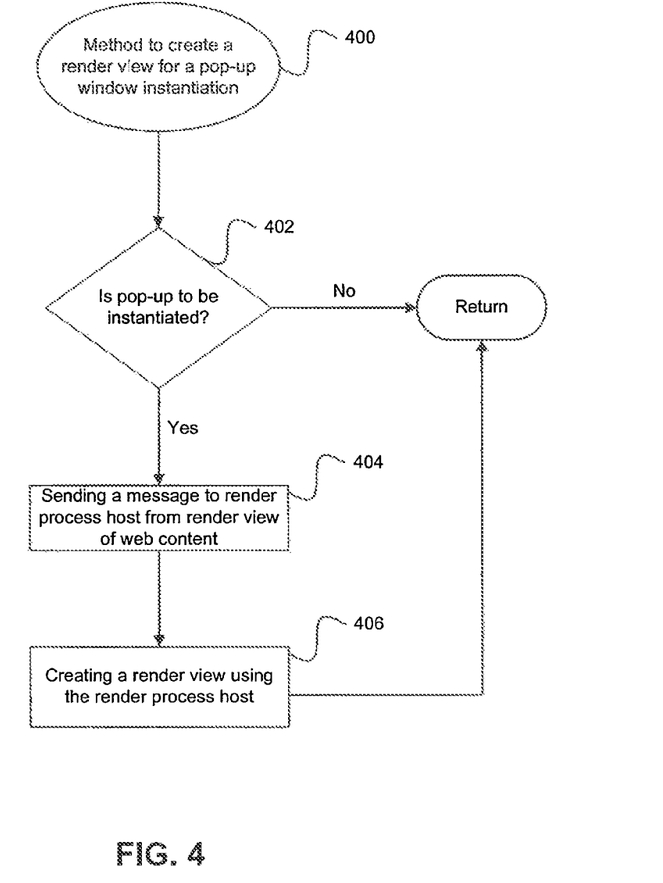
FIG. 4 is a flowchart illustrating a method which may be used to create a render view for a newly instantiated pop-up window according to an embodiment.

FIG. 4 is a flowchart illustrating a method 400 according to an embodiment which may be used to create a render view for a pop-up window that is to be instantiated (steps 402-412). Method 400 begins with browser process 110 checking if a content area has requested instantiation of a pop-up window (step 402). If the content area in browser process 110 has not requested instantiation of a pop-up window, method 400 returns. If the content area in browser process 110 has instantiated a pop-up, render view 246 corresponding to the content sends a message to the corresponding render process host 214 to instantiate a new render view 246 for the pop-up window (step 404) Render view 246 is created using render process host 214 (step 406). In this way, a new render view for a pop-up window may be created.

Figure 5:
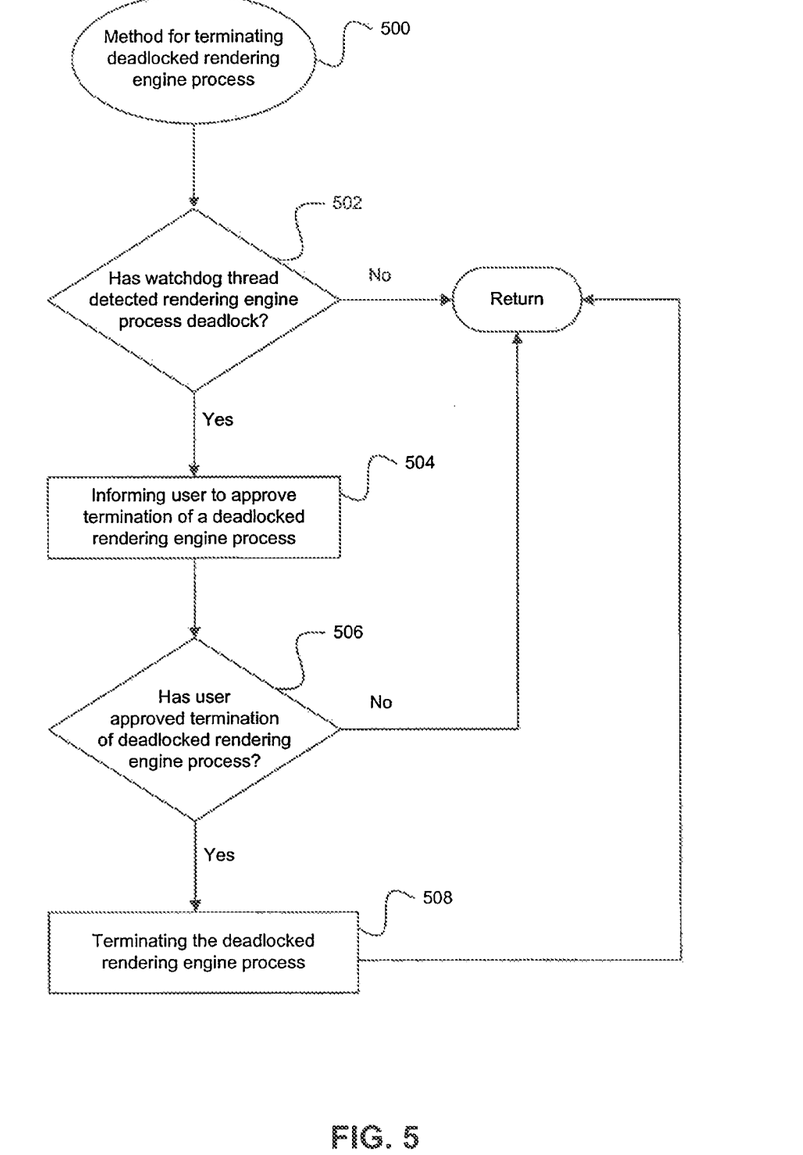
FIG. 5 is a flowchart illustrating a method which may be used for terminating a deadlocked rendering engine process according to an embodiment.

FIG. 5 is a flowchart illustrating a method 500 according to an embodiment which may be used to terminate a deadlocked rendering engine process 120A-N (steps 502-506). Method 500 begins with browser process 110 checking if watchdog thread 262 has detected a deadlock of rendering engine process(es) 120A-N (step 502). If watchdog thread 262 has not detected a rendering engine process deadlock, method 500 returns. If watchdog thread 262 has detected a rendering engine process deadlock, a user is informed to approve termination of deadlocked rendering engine process(es) 120A-N (step 504). Watchdog thread 262 checks if user has approved termination of the deadlocked rendering engine process(es) 120A-N (step 506). If the user has not approved the termination of deadlocked rendering engine process, method 500 returns. If the user has approved the termination of deadlocked rendering engine process(es) 120A-N, the deadlocked rendering engine process(es) 120A-N is terminated by watch dog thread 262 (step 508). In this way, a deadlocked rendering engine process 120A-N is terminated by watchdog thread 262.

Figure 6:
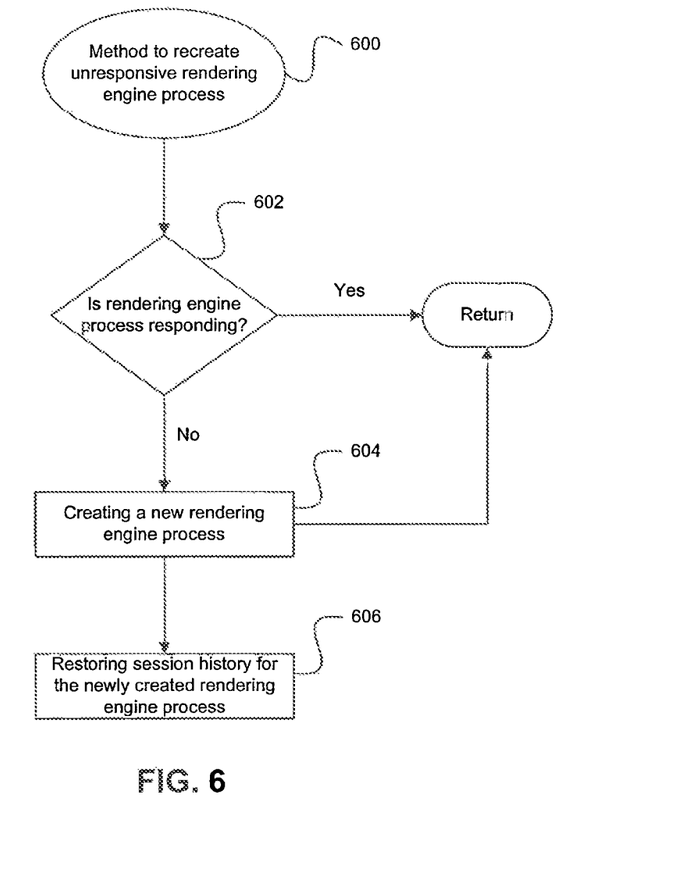
FIG. 6 is a flowchart illustrating a method which may be used to recreate an unresponsive rendering engine process according to an embodiment.

FIG. 6 is a flowchart illustrating a method 600 according to an embodiment which may be used to recreate an unresponsive rendering engine process (steps 602-606). Method 600 begins with browser process 110 checking if a rendering engine process 120A process is responding (step 602). If a rendering engine process 120A is responding, method 600 returns. If rendering engine process 120A is not responding browser process 110 creates a new rendering engine process (step 604). Browser process 110 then restores session history which may be included in browser state 212 (step 606). In this way, an unresponsive rendering engine process 120A may be recreated by browser process 110.

Example Operation

This section describes an example operation of an embodiment of multi-process browser architecture 100. Although the example operation that follows is described with respect to system 100, it is not limited to the embodiments of system 100.

In this example, a user decides to buy a book from Amazon, an online shopping store. To visit content provided by Amazon the user may first click on a browser icon on his desktop. As an example, not intended to limit the invention, this browser icon corresponds to a tab view browser. Clicking on browser icon may launch a browser process 110. Since the user needs to see content on the screen, browser process 110 may instantiate a rendering engine process 120A. In most cases, browsers have a default page known as a "home page" that a browser navigates to when it is launched. Browser process 110 may create a new render view host 218. Render view host 218 may identify a new render process host 214. Render process host 214 may create a new render view 246. Render view 246 renders content that is provided by the home page of the browser.

To visit Amazon to buy a book, the user decides to open a new tab within the browser window. When the user provides an indication to open a new tab, browser process 110 creates a new rendering engine process 120B and instantiates a tab. Browser process 110 may create a new render view host 218. Render view host 218 may identify a new render process host 214. Render process host 214 may create a new render view 246 for content related to that tab. The user may then type in the URL "http://www.amazon.com" in the address bar of the browser and may then press the "Enter" key on a keyboard to navigate to content provided by "http://www.amazon.com". Render view 246 may then render content that is provided by "http://www.amazon.com". Creation of a render view in response to new tab instantiation is described in method 300 illustrated in FIG. 3.

After render view 246 has rendered all content for "http://www.amazon.com", the user begins to view the content and decides to navigate to the Amazon book store by clicking on the "Books" link provided on the Amazon home page. When the user clicks on the "Books" link, he may navigate away from the "http://www.amazon.com" to a page having different content relating to books. Although the user may navigate away from the page, content may be rendered by the same render view 246 and a new render view may not need to be instantiated for the new content. Render view 246 then renders the content for the page relating to "Books" on the Amazon website.

Amazon may be currently running a promotional price on certain books and the web site may want to generate a pop-up window to attract the user's attention to a promotional price cut. When a pop-up window is to be generated by a Amazon content area, a message may be sent from render view 246, that corresponds to the content currently in the window, to the corresponding render process host 214. Render process host 214, then creates a new instance of render view 246 to render content corresponding to the pop-up window. Thus the pop-up window may be displayed to the user. Creation of a render view in response to new tab instantiation is described in method 400 illustrated in FIG. 4.

The user may want to continue browsing Amazon for books of interest on the "Books" page, however, certain content provided by the "Books" page causes the tab rendering the page to become unresponsive. This unresponsive behavior may be caused by an unresponsive rendering engine process 120B that is responsible for rendering the content provided by the "Books" page. In order to alert the user of this unresponsive state of the tab, for example, browser process 110 may display a prompt asking if the user wants to close the tab. Since session history and scroll positions of the content rendered in the tab have been saved by browser process 110 in browser state 212, although the user decides to close the tab to terminate renderer process 120B, browser process 110 may re-create the closed tab with the content that existed at the time, rendering engine process 120B became unresponsive. Termination of a deadlocked rendering engine process is described in method 500 in FIG. 5. Recreation of an unresponsive rendering engine process is also described in method 600 illustrated in FIG. 6.

Since rendering engine process 120B is not used by any other tabs opened in the browser, any fault in rendering engine process 120B or termination of rendering engine process 120B by watch dog thread 262 or the user may not affect the other rendering engine process 120A or browser process 110.

In this way browsers may avoid the effects of a faulty process or a number of faulty processes affecting other browser processes. This may improve user efficiency while enhancing user experience.

CONCLUSION

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer based system for instantiating a content area of a browser, comprising:
   one or more processors;
   a memory coupled to the one or more processors;
   a plurality of rendering engine processes; and
   at least one browser process that communicates with the plurality of rendering engine processes,
   wherein each rendering engine process of the plurality of rendering engine processes renders content in content areas of the browser, and
   wherein the browser process and the plurality of rendering engine processes are implemented on the one or more processors.

2. The system of claim 1, wherein a rendering engine process renders a parent content area and a child content area, the parent content area instantiates the child content area, and the parent content area communicates with the child content area via a handle.

3. The system of claim 2, wherein the parent content area is a tab or a window, and the child content area is a tab or a window.

4. The system of claim 2, wherein the handle is an identifier that enables the parent content area to establish communication with the child content area.

5. The system of claim 2, wherein a same rendering engine process that rendered the parent content area is used to render content in the child content area.

6. The system of claim 2, wherein a second rendering engine process different from the rendering engine process renders content in a content area different from the parent content area and the child content area of the browser.

7. The system of claim 1, wherein any one instance of the plurality of rendering engine processes is associated with an active content area at a given time, and the active content area refers to a content area that a user is currently interacting with.

8. The system of claim 7, wherein a rendering engine process that renders a foreground content area is given a higher priority than a rendering engine process that renders a background content area.

9. The system of claim 8, wherein a lower priority process is given a lower priority in an allocation of system resources.

10. The system of claim 8, wherein a lower priority process is more likely to have its memory swapped out than a higher priority process.

11. The system of claim 7, wherein the active content area is a foreground tab or a foreground window.

12. A computer implemented method for instantiating a content area of a browser, comprising:
   (a) instantiating a browser process that manages content for display in content areas of a browser; and (b) instantiating rendering engine processes for content areas instantiated in the browser process, wherein a first rendering engine process is instantiated for a first content area instantiated in the browser process, and a second rendering engine process is instantiated for a second content area instantiated in the browser process; and wherein at least one of steps (a)-(b) is implemented on one or more processors.

13. The method of claim 12, further comprising:
(c) at the first rendering engine process, rendering the first content area in the browser process; and
(d) at the first rendering engine process, rendering a third content area in the browser process, wherein the first content area instantiates the third content area, and the first content area communicates with the third content area via a handle.

14. The method of claim 13, wherein the first content area is a tab or a window, and the third content area is a tab or a window.

15. The method of claim 12, wherein any one rendering engine process is associated with an active content area at a given time, the active content area referring to a content area that a user is currently interacting with.

16. The method of claim 15, further comprising:
(c) at the first rendering engine process, rendering content in the first content area of the browser;
(d) at the second rendering engine process, rendering content in the second content area of the browser;
(e) assigning a higher priority to the first rendering engine process than the second rendering engine process when the first content area is the active content area; and
(f) assigning a higher priority to the second rendering engine process than the first rendering engine process when the second content area is the active content area.

17. The method of claim 16, further comprising:
(g) allocating more system resources to a higher priority process compared to a lower priority resource.

18. The method of claim 16, wherein a lower priority process is more likely to have its memory swapped out than a higher priority process.

19. The method of claim 15, wherein the active content area is a foreground tab or a foreground window.

20. A non-transitory computer-readable storage medium having instructions stored thereon that, when executed by a processing device, cause the processing device to perform operations to:
(a) instantiate a browser process that manages content for display in content areas of a browser; and
(b) instantiate rendering engine processes for content areas instantiated in the browser process, wherein a first rendering engine process is instantiated for a first content area instantiated in the browser process, and a second rendering engine process is instantiated for a second content area instantiated in the browser process.

* * * * *